United States Patent
Zhu

(10) Patent No.: US 11,592,570 B2
(45) Date of Patent: Feb. 28, 2023

(54) AUTOMATED LABELING SYSTEM FOR AUTONOMOUS DRIVING VEHICLE LIDAR DATA

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 417 days.

(21) Appl. No.: 16/800,125

(22) Filed: Feb. 25, 2020

(65) Prior Publication Data

US 2021/0263157 A1    Aug. 26, 2021

(51) Int. Cl.
  *G01S 17/89*    (2020.01)
  *G01S 13/86*    (2006.01)
  *G06V 20/56*    (2022.01)
  *G01S 17/931*   (2020.01)
  *G01S 17/86*    (2020.01)

(52) U.S. Cl.
  CPC ............ *G01S 17/89* (2013.01); *G01S 13/865* (2013.01); *G01S 17/86* (2020.01); *G01S 17/931* (2020.01); *G06V 20/56* (2022.01)

(58) Field of Classification Search
  CPC ...... G01S 13/865; G01S 13/867; G01S 17/86; G01S 17/89; G01S 17/931; G01S 7/411; G01S 7/417; G01S 7/4802; G06K 9/6256; G06K 9/627; G06K 9/6289; G06N 3/08; G06V 10/82; G06V 20/56
  USPC ....................................................... 358/474
  See application file for complete search history.

(56) References Cited

U.S. PATENT DOCUMENTS

| | | | |
|---|---|---|---|
| 2019/0011929 A1* | 1/2019 | Maeno | G05D 1/0274 |
| 2019/0317505 A1* | 10/2019 | Li | G01C 21/3407 |
| 2019/0317507 A1* | 10/2019 | Zhang | G05D 1/0278 |
| 2019/0317515 A1* | 10/2019 | Zhang | B60W 30/09 |
| 2019/0382031 A1* | 12/2019 | Hu | B60W 50/0205 |
| 2020/0110410 A1* | 4/2020 | Murai | G05D 1/024 |
| 2021/0107147 A1* | 4/2021 | Xu | B25J 9/163 |
| 2021/0163037 A1* | 6/2021 | Zhu | B60W 30/143 |
| 2021/0302582 A1* | 9/2021 | Liu | G01S 17/931 |
| 2021/0356599 A1* | 11/2021 | Liu | G01S 7/4802 |
| 2021/0403001 A1* | 12/2021 | Del Pero | G06K 9/6218 |
| 2022/0299648 A1* | 9/2022 | Liu | G01S 17/89 |

(Continued)

*Primary Examiner* — Negussie Worku
(74) *Attorney, Agent, or Firm* — Womble Bond Dickinson (US) LLP

(57) ABSTRACT

A system and method for using high-end perception sensors such as high-end LIDARs to automatically label sensor data of low-end LIDARs of autonomous driving vehicles is disclosed. A perception system operating with a high-end LIDAR may process sensed data from the high-end LIDAR to detect objects and generate metadata of objects surrounding the vehicle. The confidence level of correctly identifying the objects using the high-end LIDAR may be further enhanced by fusing the data from the high-end LIDAR with data from other sensors such as cameras and radars. The method may use the detected objects and metadata of the detected objects processed from the data captured by the high-end LIDAR and other sensors as ground truth to label data of a same scene captured by a low-end LIDAR mounted on the vehicle. A neural network may use the labeled sensor data from the low-end LIDAR during offline supervised training.

20 Claims, 11 Drawing Sheets

(56) References Cited

U.S. PATENT DOCUMENTS

2022/0324438 A1* 10/2022 Liu .................. B60W 30/16
2022/0326374 A1* 10/2022 Torres ............... G01S 7/0235

* cited by examiner

400

| Application 401 | Planning and Control 402 | Perception 403 | Device Driver(s) 404 | Firmware 405 | Hardware 406 |

FIG. 4

AUTOMATED LABELING SYSTEM FOR AUTONOMOUS DRIVING VEHICLE LIDAR DATA

TECHNICAL FIELD

Embodiments of the present disclosure relate generally to operating autonomous vehicles. More particularly, embodiments of the disclosure relate to methods and systems for automating the labeling of sensor data from perception sensors of an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicles can navigate to various locations using onboard sensors, allowing the vehicles to travel with minimal human interaction or in some cases without any passengers.

Motion planning and control are critical operations in autonomous driving. The safety, accuracy and efficiency of motion planning and control operations depend on the ability of the ADVs to sense and predict the motions of moving obstacles such as other vehicles or pedestrians as well as to recognize non-moving objects. Sensors such as cameras, light detection and range (LIDAR) units, radars, etc., are used to capture video and electromagnetic images of environments around the vehicles. The ADVs may process information captured by the sensors to perceive driving environment including obstacles, traffic elements and road features surrounding the ADVs for planning and controlling the motions of the ADVs.

To recognize objects surrounding an ADV and to predict the motions or trajectories of nearby vehicles for safe navigation, a perception module of the ADV may use a neural network that operates on the captured sensor data. The sensor data may be captured by high-end LIDARs with 64 or 128 laser rays together with those of cameras, radars, etc. However, due to the high cost of high-end LIDARs and associated computational hardware, it may be desirable to find low-cost LIDARs that have 16, 32, or 40 rays. For the perception module to operate with the low-cost LIDARs, the neural network of the perception module may need to be trained using labeled data captured by the low-cost LIDARs. Labeling of perception data from sensors is a time consuming, costly, and often manual process. It is desirable to be able to automatically, efficiently, and cost-effectively label perception data from low-cost LIDARs for training neural networks of perception modules of ADVs that operate with the low-cost LIDARs.

BRIEF DESCRIPTION OF THE DRAWINGS

Embodiments of the disclosure are illustrated by way of example and not limitation in the figures of the accompanying drawings in which like references indicate similar elements.

FIG. 4 is a block diagram illustrating an architecture of an autonomous driving system according to one embodiment.

DETAILED DESCRIPTION

Figure 1:
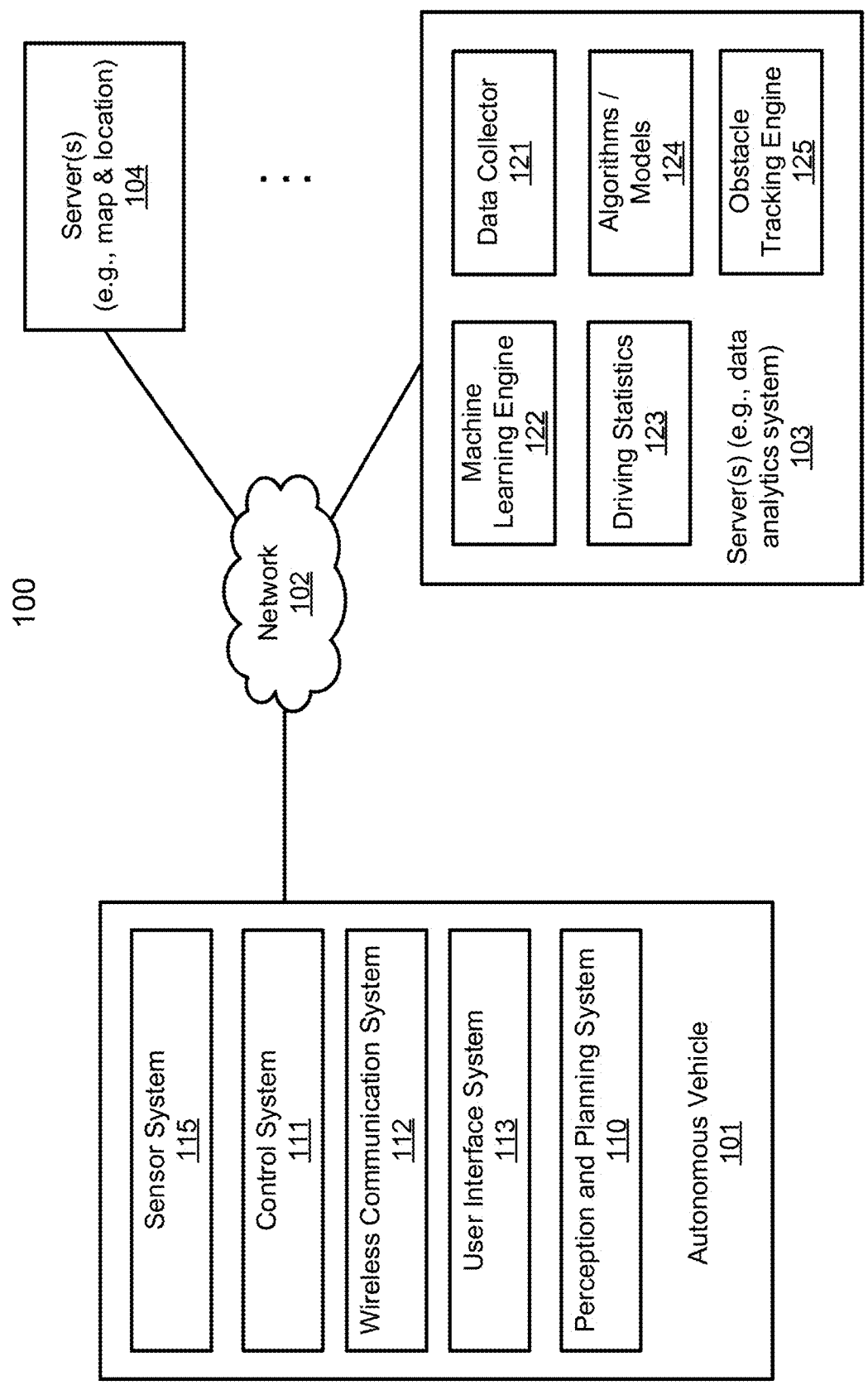
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Motion planning and control of an ADV depends on the ability of the ADV to perceive the driving environment around the ADV such as detecting the trajectories of moving vehicles or pedestrians around an ADV, as well as the locations of traffic elements, road features, and other non-moving objects. To recognize objects surrounding an ADV and to predict the motions or trajectories of nearby vehicles for safe navigation, a perception module of the ADV may use a neural network that operates on the data captured by the perception sensors, such as high-end LIDARs. Due to the cost of high-end LIDARs, which typically have 64 or 128 rays and the cost of associated hardware, it is desirable to use low-end LIDARs that may have only 40, 32, or 16 rays. The neural network of the perception module may be trained, such as during offline supervised training, to recognize various objects using sensor data of the low-end LIDARs that have been labeled as representing the objects. Labeling of sensor data for training, however, is a time consuming and costly process. Disclosed are methods and systems for using high-end perception sensors such as high-end LIDARs to automatically and efficiently label sensor data of low-end perception sensors.

According to some embodiments, a perception module operating with a high-end LIDAR on an ADV may process sensed data from the high-end LIDAR to detect objects and generate information on objects surrounding the ADV. The confidence level of correctly identifying the objects from the perception module using the high-end LIDAR is generally high and may be further enhanced by fusing the data from the high-end LIDAR with data from other sensors such as cameras and radars. The perception module may use the detected objects and information on the detected objects processed from the data captured by the high-end LIDAR and other sensors as ground truth to label data of a same scene captured by one or more low-end LIDARs mounted on the ADV. The data from the low-end LIDARs may be labeled according to the type of objects the data represent, such as vehicles, human, bicycles, obstacles, non-moving objects, etc. Other labeled information may include the relative position, speed, acceleration, trajectories, size, etc., of moving objects or the size, shape, or other physical characteristics of the objects. In some embodiments, data that cannot be labeled as a known object may be distinguished from data that correspond to known objects. For example, an image processed from the sensed data of the low-end LIDARs may identify unknown objects using a polygon box and known objects using a rectangle.

Due to the sophistication of the perception module processing the high-end LIDAR data fused with data from the other sensors, the labels assigned to data from the low-end LIDARs may have a high confidence level. In some embodiments, for data that cannot be labeled or to verify the correctness of a labeled object, an offline process may manually label the data or double check the veracity of the labeled data. However, even when sporadic manual labeling of the sensor data is performed, using the output from the perception module operating on the high-end sensor data as ground truth to automatically label sensor data from the low-end sensors is more efficient than labeling all the sensor data using a manual process. The neural network of the perception module may use the labeled sensor data from the low-end LIDARs during offline supervised training to recognize objects corresponding to the labeled data.

According to one embodiment, a method is disclosed for labeling sensor data captured by an ADV. The method includes receiving sensor data captured by a reference LIDAR of the ADV. The method also includes detecting objects in a driving environment surrounding the ADV by processing the sensor data captured by the reference LIDAR to generate information for the detected objects. The method further includes collecting sensor data captured by a target LIDAR of the ADV. The method further includes labeling the sensor data captured by the target LIDAR by using the information for the objects detected from processing the sensor data captured by the reference LIDAR. The information for the detected objects may be used as ground truth to generate labeled objects for the sensor data captured by the target LIDAR.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc. In one embodiment, autonomous vehicle 101 may download HD maps from servers 103 or 104 for use in motion planning and control.

An autonomous vehicle refers to a vehicle that can be configured to operate in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
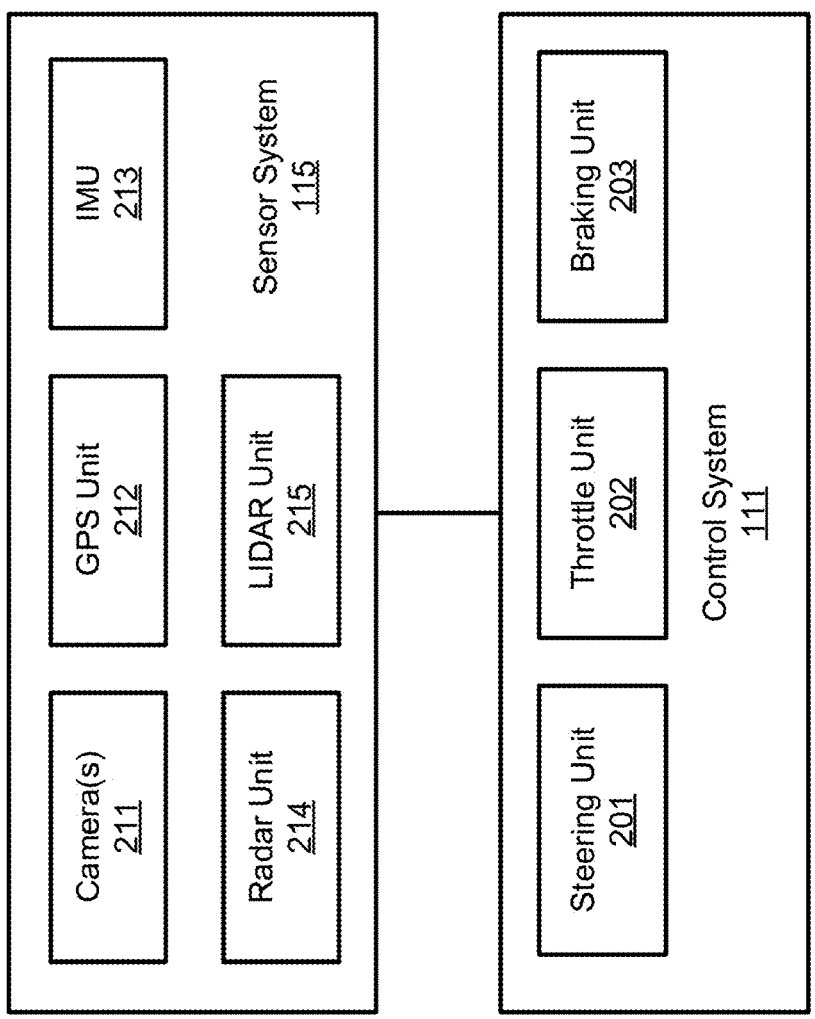
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as a sonar sensor, an infrared sensor, a steering sensor, a throttle sensor, a braking sensor, and an audio sensor (e.g., a microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor senses the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is configured to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110. In one embodiment, the location and MPOI information may be obtained from HD maps downloaded from servers 103-104.

While autonomous vehicle 101 is moving along the route, perception and planning system 110 may also obtain real-time traffic information from a traffic information system or server (TIS). Note that servers 103-104 may be operated by a third party entity, such as a service provider that downloads a starting position and a destination position to perception and planning system 110 for perception and planning system 110 to plan a route. The third party may also issue commands to perception and planning system 110 to command autonomous vehicle 101 to start traveling on the planned route. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc. Driving statistics 123 may further include poses captured by IMU and GPS sensors describing a position and orientation of the vehicles.

Based on driving statistics 123, machine learning engine 122 generates or trains a set of rules, algorithms, and/or predictive models 124 for a variety of purposes. In one embodiment, algorithms 124 may include deep learning neural network models used to predict the trajectories of other vehicles in the environment of autonomous vehicle 101 to enable perception and planning system 110 to navigate autonomous vehicle 101 to avoid colliding with the other vehicles.

In some embodiments, data analytics system 103 may perform perception data labeling of data captured by a low-end LIDAR mounted on autonomous vehicle 101. Data collector 121 may collect detected objects and information on the detected objects generated by perception and planning system 110 that processes data captured by a high-end LIDAR and other sensors of sensor system 115 of autonomous vehicle 101. Data collector 121 may also collect data captured by the low-end LIDAR. Data analytics system 103 may use the detected objects and information on the detected objects as ground truth to label data from the low-end LIDAR. Machine learning engine 122 may train the set of rules, algorithms, and/or predictive models 124 of a deep learning neural network using the labeled sensor data from the low-end LIDAR. The trained set of rules, algorithms, and/or predictive models 124 may be used by perception and planning system 110 to detect objects in the environment of autonomous vehicle 101 based on data captured by the low-end LIDAR.

Algorithms 124 may be uploaded on ADVs to be utilized during autonomous driving in real-time or may be utilized by other modules such as obstacle tracking engine 125 of server 103. In one embodiment, obstacle tracking engine 125 can predict the near-term motions or trajectories of moving obstacles such as vehicles or pedestrians surrounding autonomous vehicle 101 based on the past trajectories of the moving obstacles and the environment in which the moving obstacles operate. Although obstacle tracking engine 125 is shown as part of server 103, in some embodiments, engine 125 may be part of server 104.

Figure 3A:
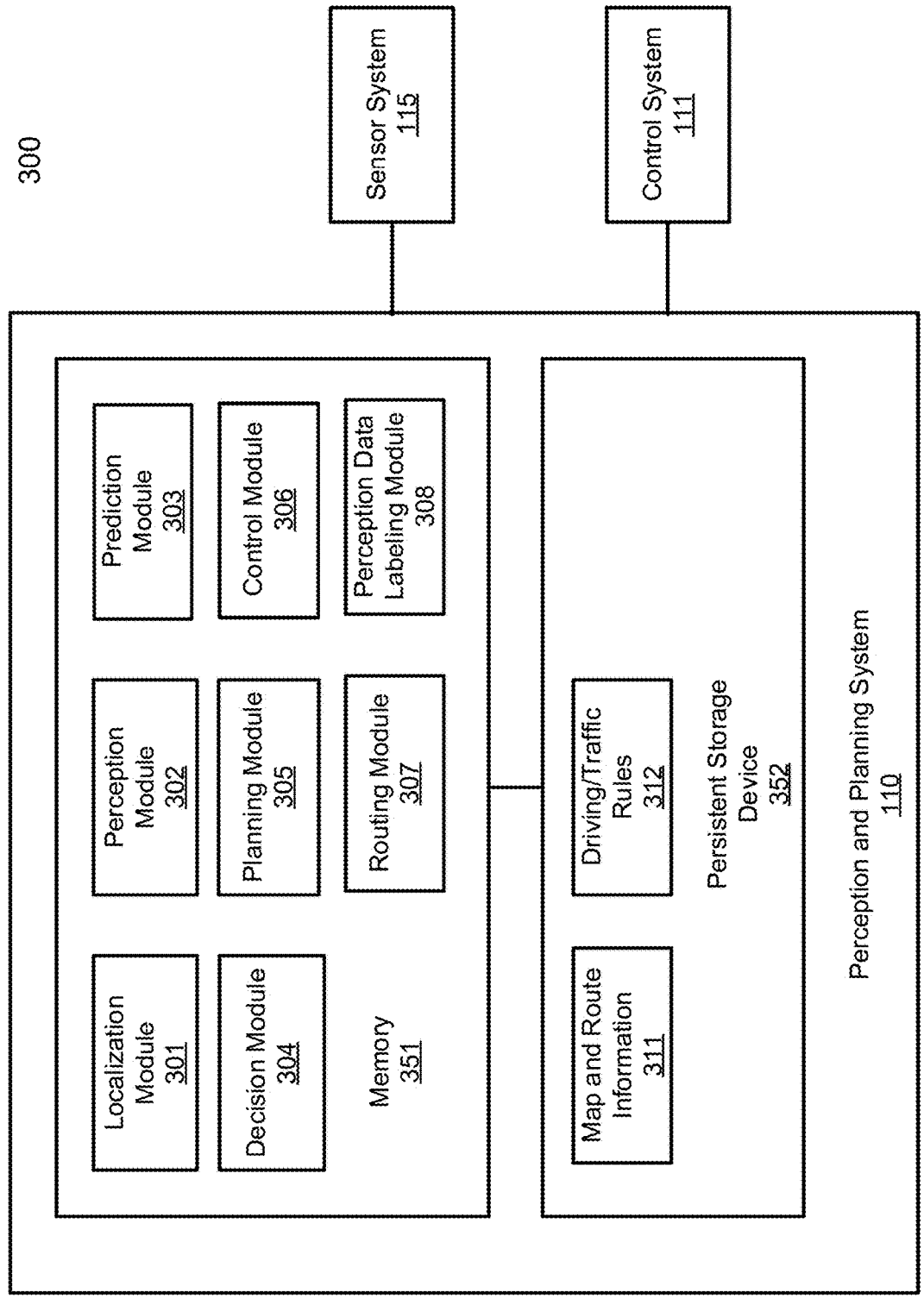
FIGS. 3A-3B are block diagrams illustrating an example of a perception and planning system used with an autonomous vehicle according to one embodiment.
Figure 3B:
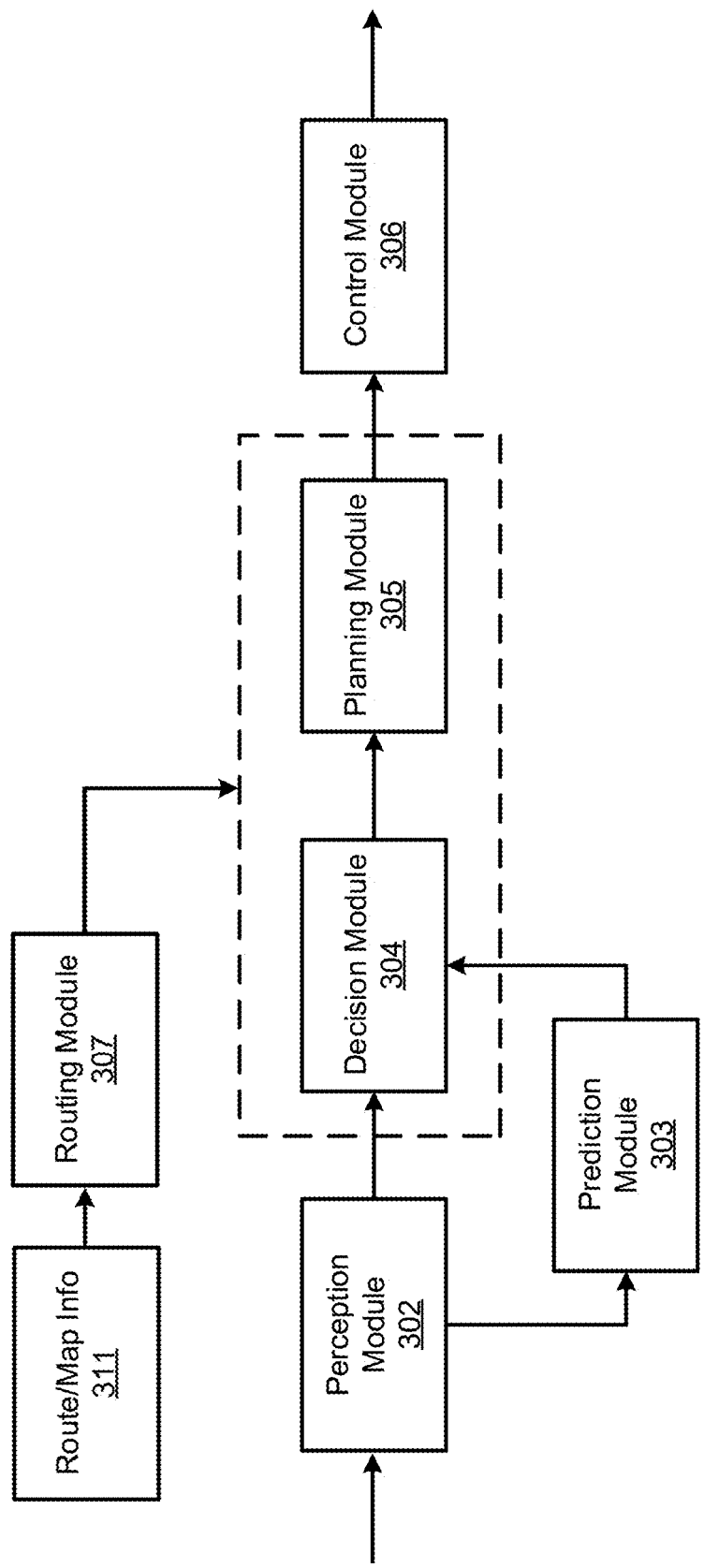

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and perception data labeling module 308.

Some or all of modules 301-308 may be implemented in software, hardware, or a combination thereof. For example, these modules may be installed in persistent storage device 352, loaded into memory 351, and executed by one or more processors (not shown). Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions. Note that some or all of these modules may be communicatively coupled to or integrated with some or all modules of vehicle control system 111 of FIG. 2. Some of modules 301-308 may be integrated together as an integrated module. For example, decision module 304 and planning module 305 may be integrated as a single module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. In one embodiment, the map and route information 311 may be HD maps. The HD maps may be downloaded from the location server and the MPOI server. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle 101. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR. In one embodiment, perception module 302 may generate an image map that shows the current positions, current headings, and past trajectories of other vehicles or pedestrians in the environment of autonomous vehicle 101. The objects, features, information on the motion of the objects, and metadata describing the objects may be used as ground truth to label images captured by another sensor such as a low-end LIDAR disclosed in embodiments of the disclosure.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Thus, based on a decision for each of the objects perceived, decision module 304 and/or planning module 305 plans a path or route for the autonomous vehicle, as well as driving parameters (e.g., distance, speed, and/or turning angle), using the reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect pedestrians, vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

In some embodiments, perception data labeling module 308 may use detected objects and metadata on the detected objects from perception module 302 as ground truth to label data from a low-end LIDAR. The labeled data may be used to train a set of rules, algorithms, and/or predictive models of a deep learning neural network of perception module 302. The trained set of rules, algorithms, and/or predictive models may be used by perception module 302 to detect objects in the environment of the autonomous vehicle based on data captured by the low-end LIDAR.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5A:
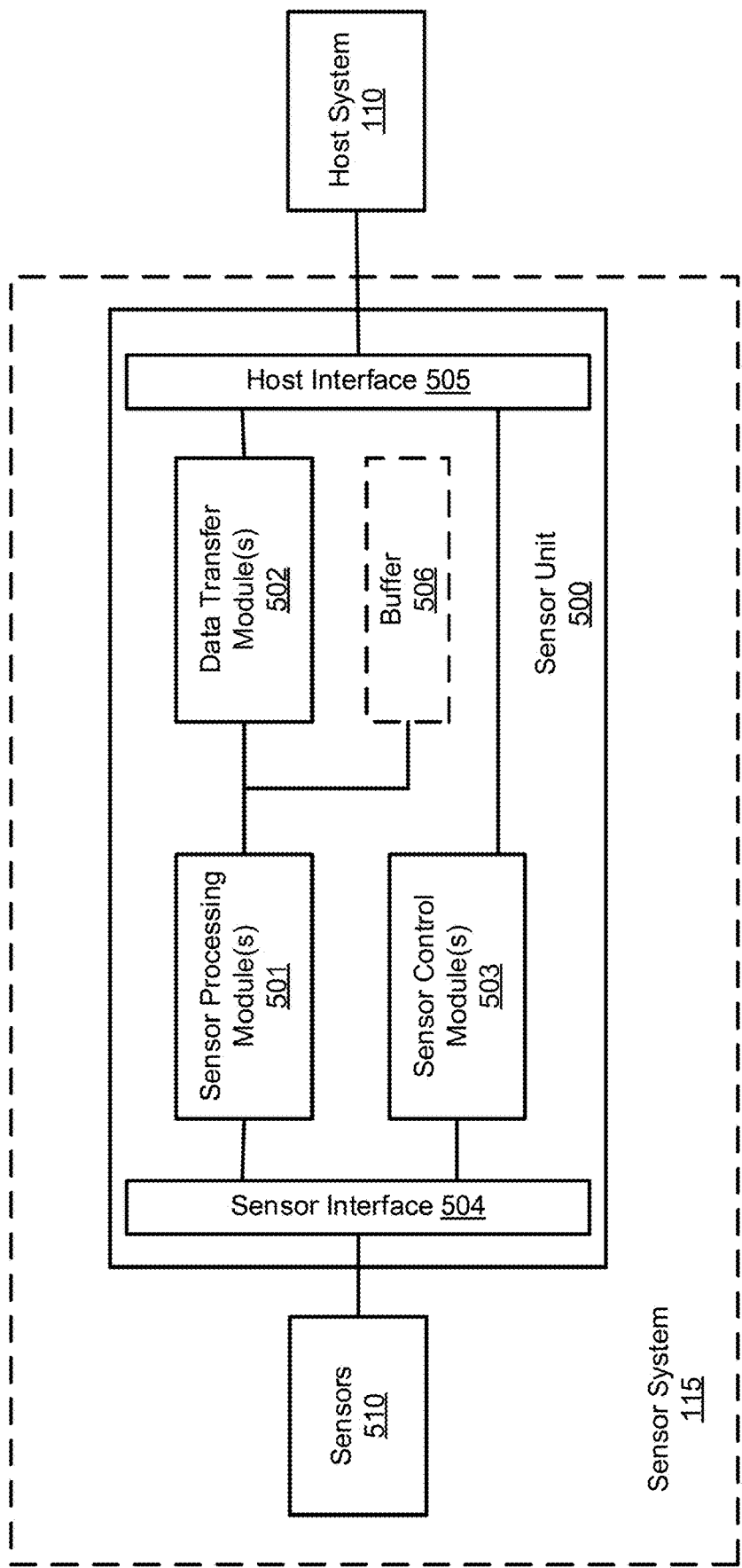
FIG. 5A is a block diagram illustrating an example of a sensor unit according to one embodiment.

FIG. 5A is a block diagram illustrating an example of a sensor system according to one embodiment of the disclosure. Referring to FIG. 5A, sensor system 115 includes a number of sensors 510 and a sensor unit 500 coupled to host system 110. Host system 110 represents a planning and control system as described above, which may include at least some of the modules as shown in FIGS. 3A and 3B. Sensor unit 500 may be implemented in a form of an FPGA device or an ASIC (application specific integrated circuit) device. In one embodiment, sensor unit 500 includes, amongst others, one or more sensor data processing modules 501 (also simply referred to as sensor processing modules), data transfer modules 502, and sensor control modules or logic 503. Modules 501-503 can communicate with sensors 510 via a sensor interface 504 and communicate with host system 110 via host interface 505. Optionally, an internal or external buffer 506 may be utilized for buffering the data for processing.

In one embodiment, for the receiving path or upstream direction, sensor processing module 501 is configured to receive sensor data from a sensor via sensor interface 504 and process the sensor data (e.g., format conversion, error checking), which may be temporarily stored in buffer 506. Data transfer module 502 is configured to transfer the processed data to host system 110 using a communication protocol compatible with host interface 505. Similarly, for the transmitting path or downstream direction, data transfer module 502 is configured to receive data or commands from host system 110. The data is then processed by sensor processing module 501 to a format that is compatible with the corresponding sensor. The processed data is then transmitted to the sensor.

In one embodiment, sensor control module or logic 503 is configured to control certain operations of sensors 510, such as, for example, timing of activation of capturing sensor data, in response to commands received from host system (e.g., perception module 302) via host interface 505. Host system 110 can configure sensors 510 to capture sensor data in a collaborative and/or synchronized manner, such that the sensor data can be utilized to perceive a driving environment surrounding the vehicle at any point in time.

Sensor interface 504 can include one or more of Ethernet, USB (universal serial bus), LTE (long term evolution) or cellular, WiFi, GPS, camera, CAN, serial (e.g., universal asynchronous receiver transmitter or UART), SIM (subscriber identification module) card, and other general purpose input/output (GPIO) interfaces. Host interface 505 may be any high speed or high bandwidth interface such as PCIe (peripheral component interconnect or PCI express) interface. Sensors 510 can include a variety of sensors that are utilized in an autonomous driving vehicle, such as, for example, a camera, a LIDAR device, a RADAR device, a GPS receiver, an IMU, an ultrasonic sensor, a GNSS (global navigation satellite system) receiver, an LTE or cellular SIM card, vehicle sensors (e.g., throttle, brake, steering sensors), and system sensors (e.g., temperature, humidity, pressure sensors), etc.

For example, a camera can be coupled via an Ethernet or a GPIO interface. A GPS sensor can be coupled via a USB or a specific GPS interface. Vehicle sensors can be coupled via a CAN interface. A RADAR sensor or an ultrasonic sensor can be coupled via a GPIO interface. A LIDAR device can be coupled via an Ethernet interface. An external SIM module can be coupled via an LTE interface. Similarly, an internal SIM module can be inserted onto a SIM socket of sensor unit 500. The serial interface such as UART can be coupled with a console system for debug purposes.

Note that sensors 510 can be any kind of sensors and provided by various vendors or suppliers. For example, sensors 510 may include a high-end LIDAR, a camera, and a radar whose data may be fused and processed by host system 110 to detect objects and generate information on objects surrounding the autonomous vehicle. The objects may include traffic signals, road way boundaries, other vehicles, pedestrians, and/or obstacles, etc. Information on the objects may include the current positions, current headings, and past trajectories of other vehicles or pedestrians in the environment. Sensors 510 may also include one or more low-end LIDAR units whose data are labeled using the objects and information on the objects detected from data captured by the high-end LIDAR and other sensors as ground truth.

Sensor processing module 501 is configured to handle different types of sensors and their respective data formats and communication protocols. According to one embodiment, each of sensors 510 is associated with a specific channel for processing sensor data and for transferring the processed sensor data between host system 110 and the corresponding sensor. Each channel includes a specific sensor processing module and a specific data transfer module that have been configured or programmed to handle the corresponding sensor data and protocol, as shown in FIG. 5B.

Figure 5B:
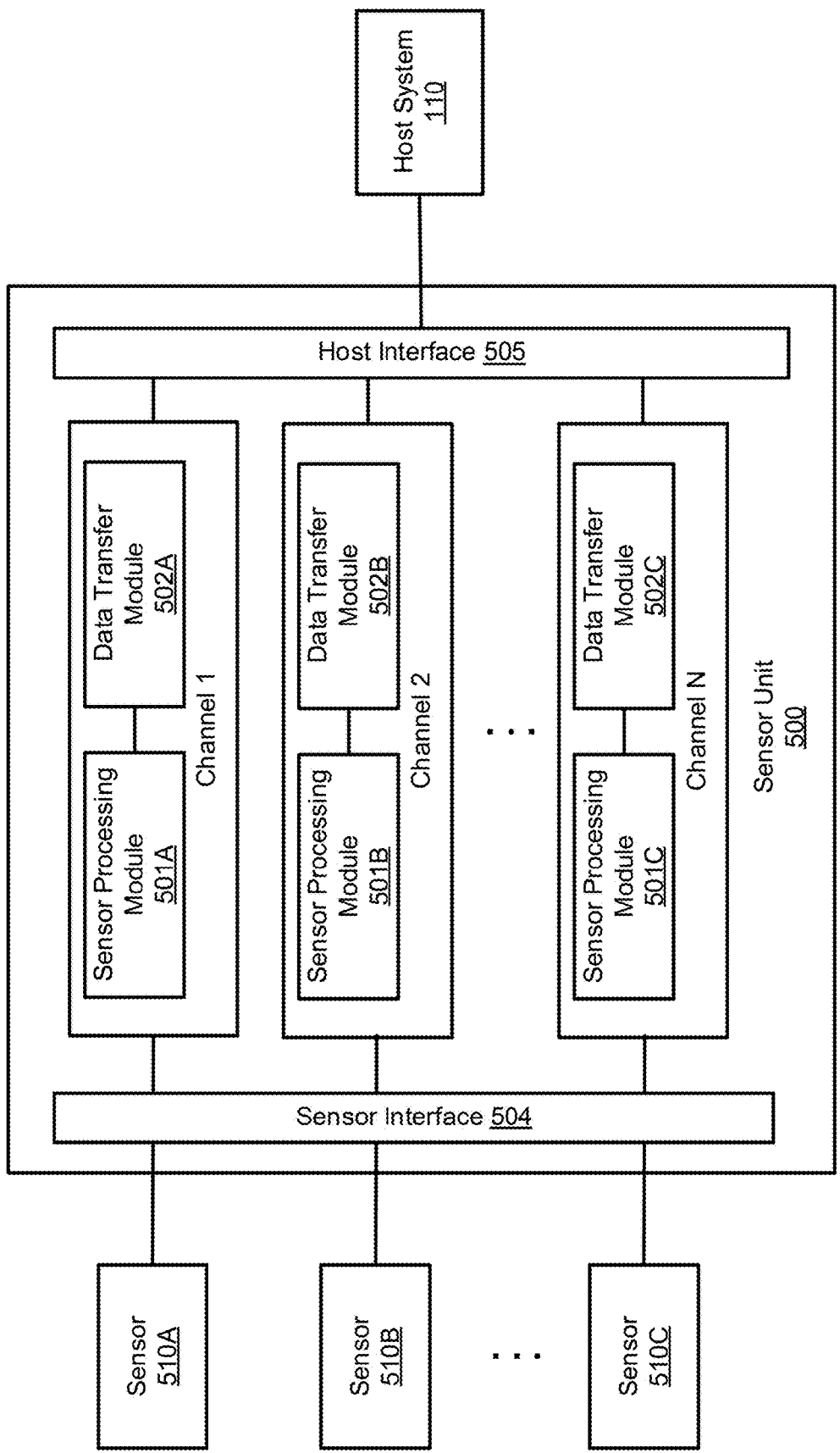
FIG. 5B is a block diagram illustrating an example of a sensor unit combining data from multiple sensors according to one embodiment.

Referring now to FIG. 5B, sensor processing modules 501A-501C are specifically configured to process sensor data obtained from sensors 510A-510C respectively. Note that sensors 510A-510C may be the same or different types of sensors. Sensor processing modules 501A-501C can be configured (e.g., software configurable) to handle different sensor processes for different types of sensors. For example, if sensor 510A is a camera, processing module 501A can be figured to handle pixel processing operations on the specific pixel data representing an image captured by camera 510A. Similarly, if sensor 510A is a LIDAR device, processing module 501A is configured to process LIDAR data specifically. That is, according to one embodiment, dependent upon the specific type of a particular sensor, its corresponding processing module can be configured to process the corresponding sensor data using a specific process or method corresponding to the type of sensor data.

Similarly, data transfer modules 502A-502C can be configured to operate in different modes, as different kinds of sensor data may be in different size or sensitivities that require different speed or timing requirement. According to one embodiment, each of data transfer modules 502A-502C can be configured to operate in one of a low latency mode, a high bandwidth mode, or a memory mode (also referred to as a fixed memory mode).

When operating in a low latency mode, according to one embodiment, a data transfer module (e.g., data transfer module 502) is configured to send the sensor data received from a sensor to the host system as soon as possible without or with minimum delay. Some of sensor data are very sensitive in terms of timing that need to be processed as soon as possible. Examples of such sensor data include vehicle status such as vehicle speed, acceleration, steering angle, etc.

When operating in a high bandwidth mode, according to one embodiment, a data transfer module (e.g., data transfer module 502) is configured to accumulate the sensor data received from a sensor up to a predetermined amount, but is still within the bandwidth of the connection between the data transfer module and the host system 110. The accumulated sensor data is then transferred to the host system 110 in a batch that maximizes the bandwidth of the connection between the data transfer module and host system 110. Typically, the high bandwidth mode is utilized for a sensor that produces a large amount of sensor data. Examples of such sensor data include camera pixel data.

When operating in a memory mode, according to one embodiment, a data transfer module is configured to write the sensor data received from a sensor directly to a memory location of a mapped memory of host system 110, similar to a shared memory page. Examples of the sensor data to be transferred using memory mode include system status data such as temperature, fans speed, etc.

Figure 6:
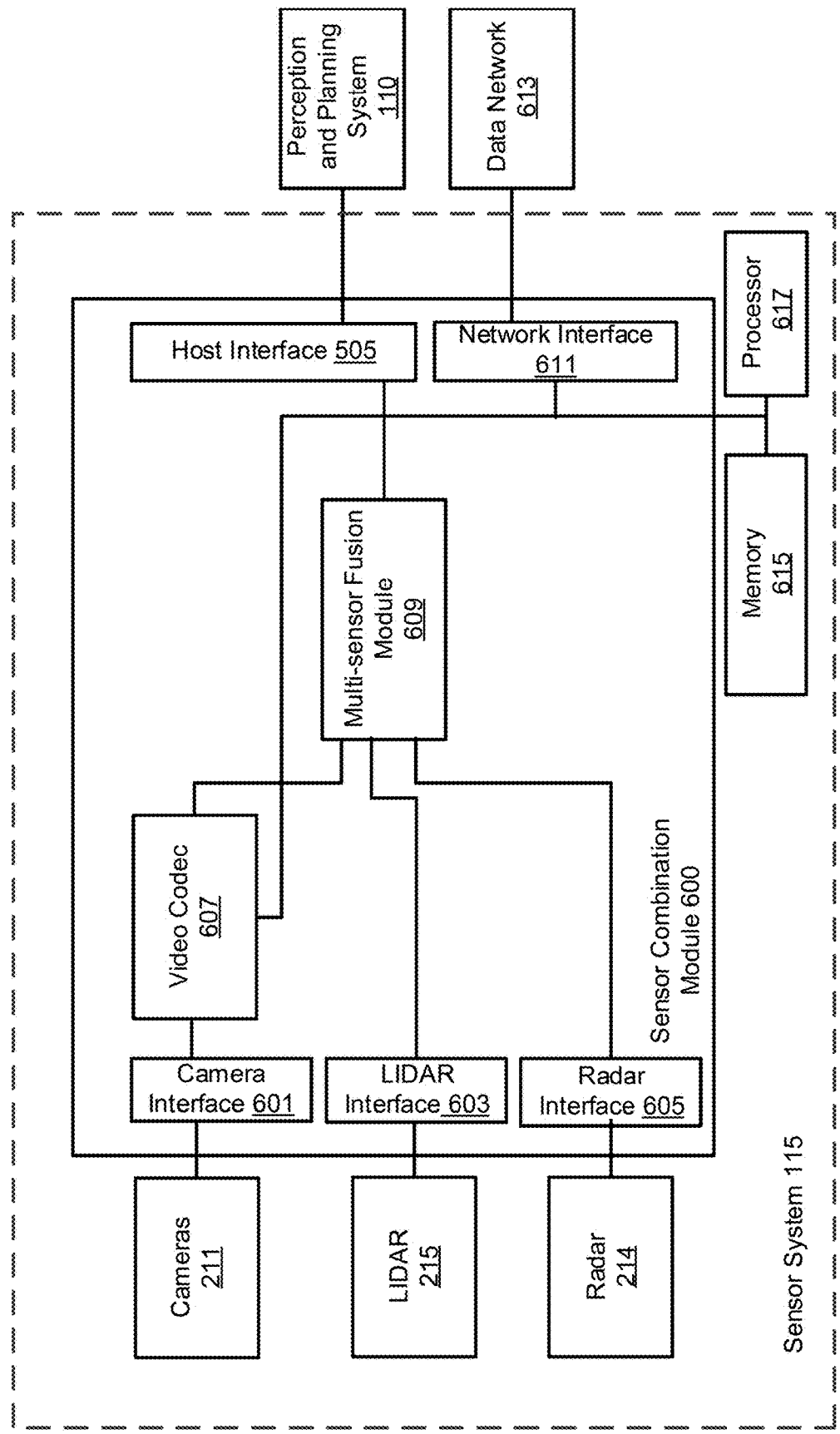
FIG. 6 is a block diagram illustrating an example of a sensor system that fuses data captured by a LIDAR and other sensors for processing by a perception and planning system according to one embodiment.

FIG. 6 is a block diagram illustrating an example of a sensor system configured to combine or fuse data captured by a LIDAR and other sensors for processing by a perception and planning system 110 according to one embodiment. Sensor unit 115 represents one embodiment of the sensor system of FIG. 5B in which the sensors include cameras 211, LIDAR 215, and radar 214. Cameras 211, LIDAR 215, and radar 241 may each include multiple sensors and each of the sensors may be associated with a channel for providing video or electromagnetic data of the environment surrounding the ADV.

A sensor combination module 600 combines or merges sensor data from camera 211, LIDAR 215, and radar 214. The sensor data combining operation may include timestamp tagging of sensor data, video compression of data from camera 211, segmentation of compressed video data, time synchronization of sensor data, merging of sensor data, etc. Sensor combination module 600 may include camera interface 601 configured to receive data from camera 211, LIDAR interface 603 configured to receive data from LIDAR 215, radar interface 605 configured to receive data from radar 214, video codec 607, multi-sensor fusion module 609, host interface 505, and network interface 611. In one embodiment, sensor combination module 600 may be implemented in a FPGA or an ASIC. Camera interface 601, LIDAR interface 603, and radar interface 605 are configured to receive data from their respective sensors and may include one or more of Ethernet, USB, LTE or cellular, WiFi, serial (e.g., UART), and other GPIO interfaces.

LIDAR interface 603 may tag data from LIDAR 215 with timestamps to indicate the time at which units of LIDAR data are received. Similarly, radar interface 605 may tag data from radar 214 with timestamps to indicate the time at which units of radar data are received. Video codec 607 may perform video compression on frames of video data from camera 211 received by camera interface 601. The compressed video data may be tagged with timestamps to indicate the time at which the corresponding frames of uncompressed video data were received by camera interface 601. Multi-sensor fusion module 609 may align or time synchronize the compressed video data, the LIDAR data, and the radar data for combining. Multi-sensor fusion module 609 may store the combined sensor data into memory 615. Processor 617 may read the combined sensor data from memory 615 for transfer to perception and planning system 110 through host interface 505 or to data network 613 through network interface 611.

Figure 7:
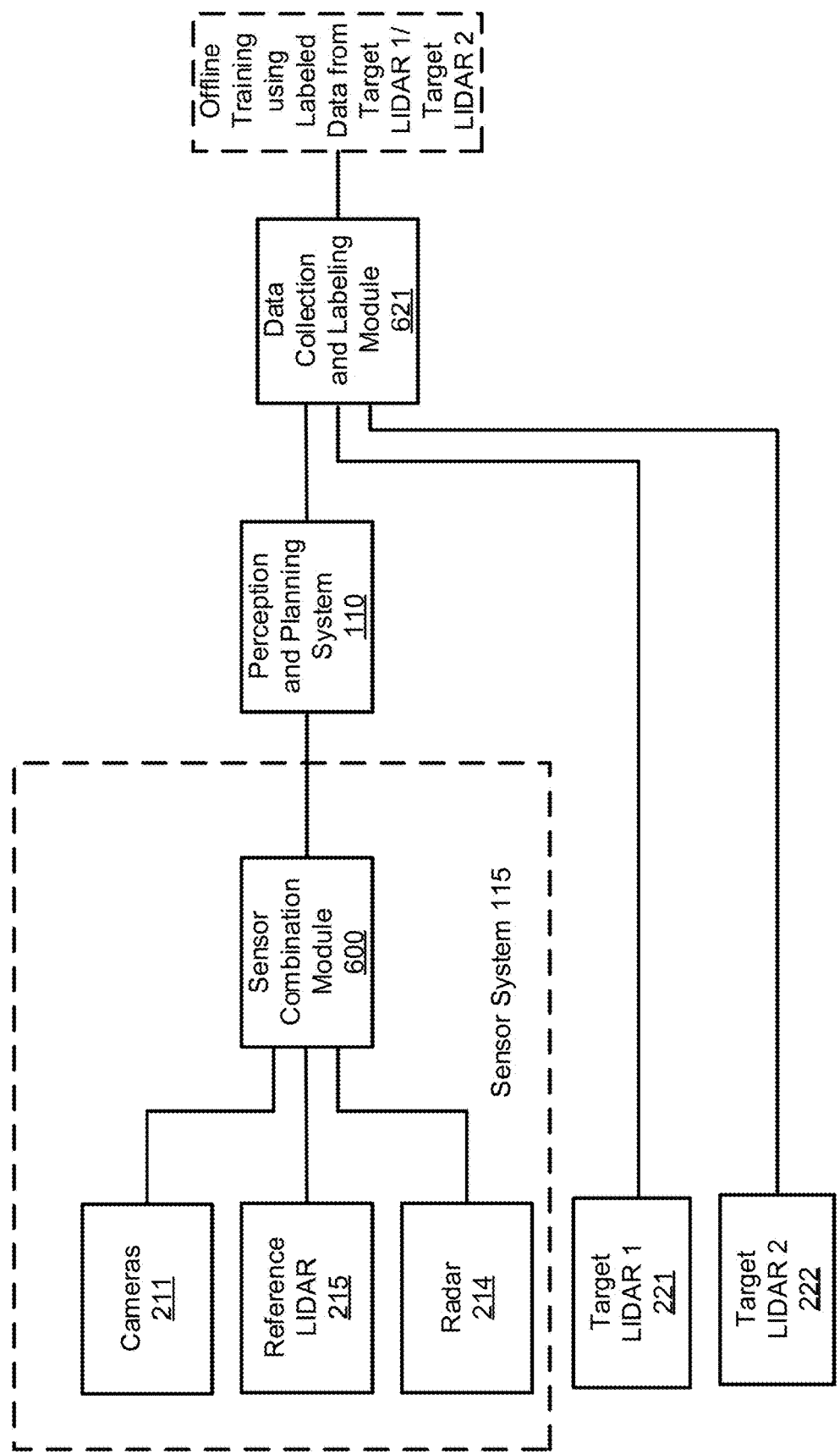
FIG. 7 is a block diagram illustrating an example of a system that captures fused data from a high-end reference LIDAR and other sensors to generate labeled objects that are used as ground truth to label data collected from a low-end target LIDAR according to one embodiment.

FIG. 7 is a block diagram illustrating an example of a system configured to capture fused data from a high-end reference LIDAR and other sensors to generate labeled objects that are used as ground truth to label data collected from a low-end target LIDAR according to one embodiment. Sensor system 115 may be the sensor system 115 of FIG. 6 configured to combine or fuse sensor data from camera 211, reference LIDAR 215, and radar 214 to generate combined sensor data.

Reference LIDAR 215 may be a high-end LIDAR that has 128 or 64 rays. A data collection autonomous vehicle may be equipped with sensor system 115 including reference LIDAR 214, camera 211, and radar 214, along with one or more low-end target LIDARs such as target LIDAR 1 (221) and target LIDAR 2 (222). Target LIDAR 1 (221) and target LIDAR 2 (222) may have only 40, 32, or 16 rays and may be mounted on the data collection autonomous vehicle at the intended 3-D position and orientation of their operational use on an autonomous vehicle.

Perception and planning system 110 may process the combined sensor data from reference LIDAR 214, camera 211, and radar 214 provided by sensor combination module 600 to detect objects and generate information or metadata of objects surrounding the data collection autonomous vehicle for each time point of a planning cycle. The objects may include lane configuration, traffic light signals, road way boundaries, other vehicles, pedestrians, bicycles, buildings, crosswalks, other traffic related signs (e.g., stop signs, yield signs), or obstacles. Information or metadata on the objects may include the current position, current speed, current acceleration, current heading, turning angle, and other motion information of each vehicles or pedestrians for each time point. Information or metadata of the objects may also include past trajectories, tracking information over previous time points, size, shape, or other physical characteristics of the objects. The confidence level of perception and planning system 110 correctly identifying the objects and their metadata from the combined sensor data is high and thus the results may be used as ground truth to label the data from low-end target LIDARs.

Data collection and labeling module 621 may receive the detected objects and the metadata of the detected objects from perception and planning module 110. In some embodiments, data collection and labeling module 621 may be data collector 121 of data analytics system 103 of FIG. 1. Data collection and labeling module 621 may also collect data captured by target LIDAR 1 (221) and target LIDAR 2 (222). In one embodiments, data captured by target LIDAR 1 (221) and target LIDAR 2 (222) may be processed first, for example by sensor processing module 501, before they are collected by data collection and labeling module 621.

Data collection and labeling module 621 may align or time-synchronize the data from target LIDAR 1 (221) and target LIDAR 2 (222) with the combined sensor data of camera 211, reference LIDAR 215, and radar 214. Data collection and labeling module 621 may use the objects and the metadata of the objects detected by perception and planning system 110 from the combined sensor data as ground truth to label data captured by target LIDAR 1 (221) and target LIDAR 2 (222). For example, data captured by the target LIDARs from a same scene as captured by the reference LIDAR and other sensors may be labeled as representing lane configuration, traffic light signals, road way boundaries, other vehicles, pedestrians, bicycles, buildings, crosswalks, obstacles, etc., from the ground truth. Metadata representing the motion information, past trajectory, physical characteristics, etc., of the objects may also be tagged on the objects.

In some embodiments, data that cannot be labeled as a known object may be distinguished from data that correspond to known objects. For example, an image processed from the captured data of the target LIDARs may identify unknown objects using a polygon box and known objects using a rectangle. In some embodiments, for data that cannot be labeled or to verify the correctness of a labeled object, an offline process may manually label the data or double check the veracity of the labeled data.

An offline machine learning engine may train a set of rules, algorithms, and/or predictive models of a deep learning neural network using the labeled data from the target LIDARs to recognize the objects corresponding to the labeled data. The trained set of rules, algorithms, and/or predictive models may be used by perception and planning system 110 to detect objects in the environment of an autonomous vehicle equipped with the target LIDARs during online operation.

Figure 8:
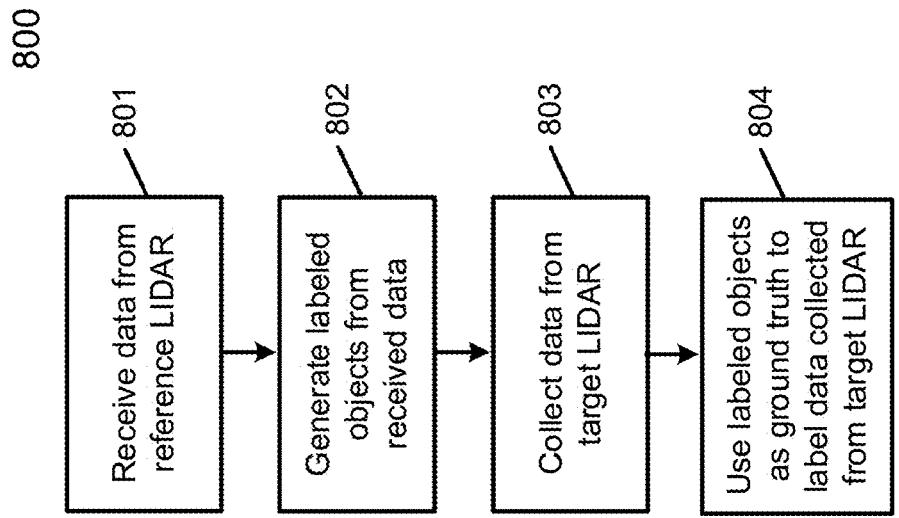
FIG. 8 is a flow diagram illustrating an example of a method for capturing data from a high-end reference LIDAR to generate labeled objects and using the labeled objects as ground truth to label data collected from a low-end target LIDAR according to one embodiment.

FIG. 8 is a flow diagram illustrating an example of a method 800 for capturing data from a high-end reference LIDAR to generate labeled objects and using the labeled objects as ground truth to label data collected from a low-end target LIDAR according to one embodiment. Method 800 may be performed by processing logic which may include software, hardware, or a combination thereof. For example, method 800 may be performed by the sensor system 115, perception and planning system 110, and data collection and labeling module 621 of an autonomous vehicle, such as described in conjunction with FIG. 7.

At operation 801, the method 800 receives data captured by a reference LIDAR. The reference LIDAR may be a high-end LIDAR that has 128 or 64 rays. A data collection autonomous vehicle may be equipped with the reference LIDAR. The reference LIDAR data may be tagged with timestamps to indicate the time at which units of the reference LIDAR data are captured or received.

At operation 802, the method 800 generates labeled objects from the received reference LIDAR data. In some embodiments, perception and planning system 110 may process the received reference LIDAR data to detect objects and generate information or metadata of objects surrounding the data collection autonomous vehicle for each time point of a planning cycle. The objects may include lane configuration, traffic light signals, road way boundaries, other vehicles, pedestrians, bicycles, buildings, crosswalks, other traffic related signs (e.g., stop signs, yield signs), or obstacles. Information or metadata on the objects may include the current position, current speed, current acceleration, current heading, turning angle, and other motion information of each vehicles or pedestrians for each time point. Information or metadata on the objects may also include past trajectories, tracking information over previous time points, size, shape, or other physical characteristics of the objects.

At operation 803, the method 800 receives from a target LIDAR data to be labeled using the labeled objects generated from the reference LIDAR data. The target LIDAR data may be tagged with timestamps to indicate the time at which units of the target LIDAR data are captured or received. In some embodiments, the target LIDAR data may be processed to generate images. In some embodiments, the method 800 may align or time-synchronize the time stamps of the target LIDAR data to the timestamps of the reference LIDAR data. The target LIDAR may be a lower-end LIDAR that is functionally less capable than the reference LIDAR, such as having only 40, 32, or 16 rays. The target LIDAR may be mounted on the data collection autonomous vehicle at the intended 3-D position and orientation of its operational use on an autonomous vehicle.

At operation 804, the method 800 uses the labeled objects and the metadata of the objects generated from the reference LIDAR data as ground truth to label data from the target LIDAR. For example, data captured by the target LIDAR from the same scene as captured by the reference LIDAR may be labeled as representing lane configuration, traffic light signals, road way boundaries, other vehicles, pedestrians, bicycles, buildings, crosswalks, obstacles, etc., from the ground truth. Metadata representing the motion information, past trajectory, physical characteristics, etc., of the objects may also be tagged on the objects.

Figure 9:
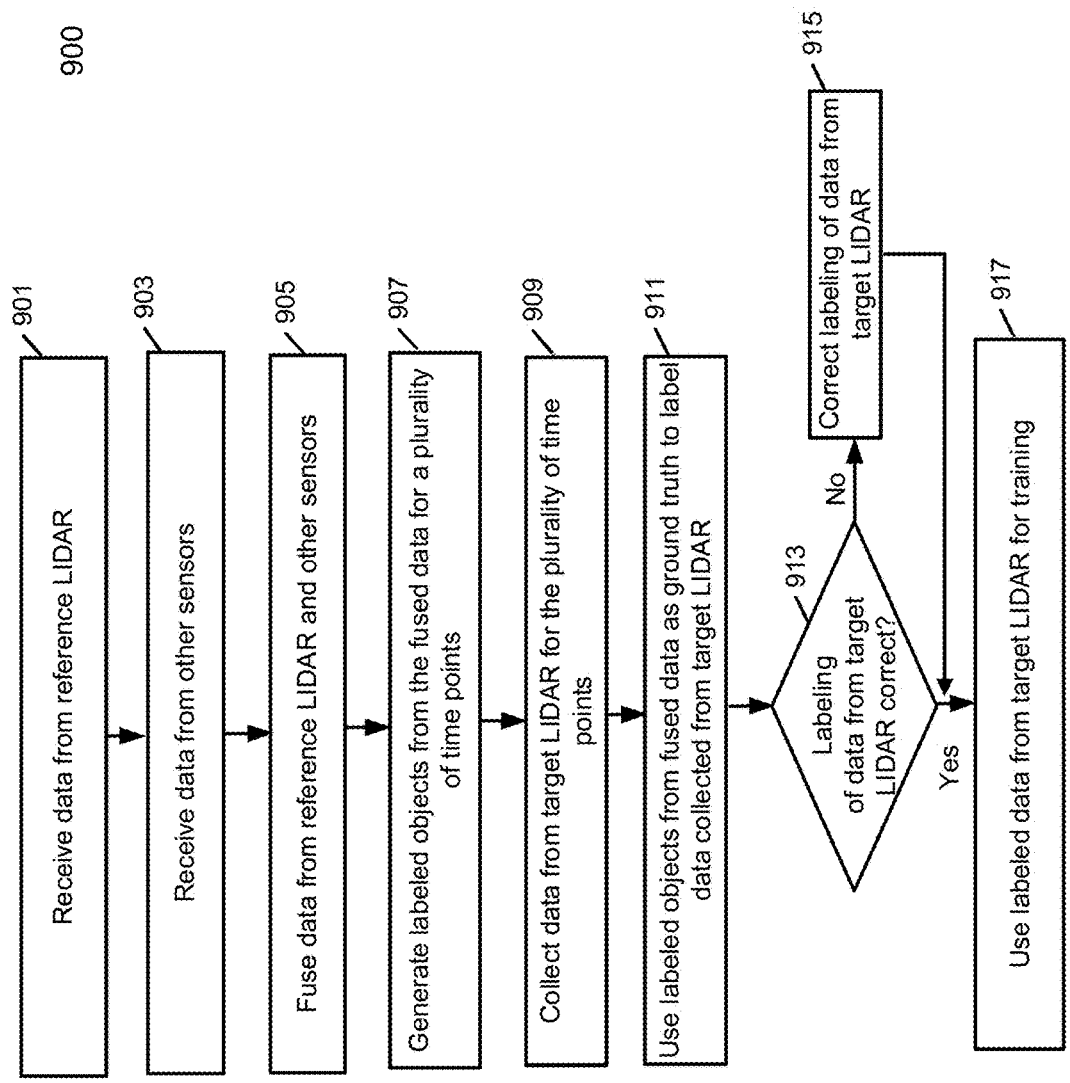
FIG. 9 is a flow diagram illustrating an example of a method for labeling data from a low-end target LIDAR using labeled objects generated from data captured by a high-end reference LIDAR and other sensors and using the labeled data from the target LIDAR to train a perception module according to one embodiment.

FIG. 9 is a flow diagram illustrating an example of a method 900 for labeling data from a low-end target LIDAR using labeled objects generated from data captured by a high-end reference LIDAR and other sensors and using the labeled data from the target LIDAR to train a perception module according to one embodiment. Method 900 may be performed by processing logic which may include software, hardware, or a combination thereof. For example, method 900 may be performed by the sensor system 115, perception and planning system 110, and data collection and labeling module 621 of an autonomous vehicle, such as described in conjunction with FIG. 7.

At operation 901, the method 900 receives data captured by a reference LIDAR. The reference LIDAR may be a high-end LIDAR that has 128 or 64 rays and mounted on a data collection autonomous vehicle. Operation 901 may be similar to operation 801.

At operation 903, the method 900 receives data captured by other sensors, such as a camera and a radar mounted on the data collection autonomous vehicle. The data captured by the other sensors may be time tagged. For example, radar data may be may be tagged with time stamps to indicate the time at which units of the radar data are captured or received. Similarly, compressed video data may be tagged with time stamps to indicate the time at which the corresponding frames of uncompressed video data were captured or received by the camera.

At operation 905, the method 900 fuses or combines data received from the reference LIDAR and data received from the other sensors to generate fused sensor data. In some embodiments, a sensor combination module, such as sensor combination module 600 of sensor system 115 of FIG. 7 may align or time synchronize the reference LIDAR and data received from the other sensors using the timestamps during the combining operation.

At operation 907, the method 900 generates labeled objects from the fused sensor data for multiple time points. In some embodiments, perception and planning system 110 may process the fused sensor data to detect objects and generate information or metadata of objects surrounding the data collection autonomous vehicle for each time point of a planning cycle. The objects may include lane configuration, traffic light signals, road way boundaries, other vehicles, pedestrians, bicycles, buildings, crosswalks, other traffic related signs (e.g., stop signs, yield signs), or obstacles. Information or metadata on the objects may include the current position, current speed, current acceleration, current heading, turning angle, and other motion information of each vehicles or pedestrians for each time point. Information or metadata on the objects may also include past trajectories, tracking information over previous time points, size, shape, or other physical characteristics of the objects. The confidence level of the method 900 correctly identifying the objects and their metadata using the fused sensor data may be higher than that using the reference LIDAR data alone.

At operation 909, the method 900 receives from a target LIDAR data for multiple time points to be labeled using the labeled objects generated from the combined sensor data. The target LIDAR data may be tagged with timestamps to indicate the time at which units of the target LIDAR data are captured or received. In some embodiments, the target LIDAR data may be processed to generate images. In some embodiments, the method 800 may align or time-synchronize the timestamps of the target LIDAR data to the timestamps of the fused sensor data. The target LIDAR may be a lower-end LIDAR that is functionally less capable than the reference LIDAR, such as having only 40, 32, or 16 rays. Operation 909 may be similar to operation 803.

At operation 911, the method 900 uses the labeled objects and the metadata of the objects generated from the fused sensor data as ground truth to label data from the target LIDAR. For example, data captured by the target LIDAR from the same scene as captured by the reference LIDAR and the other sensors may be labeled as representing lane configuration, traffic light signals, road way boundaries, other vehicles, pedestrians, bicycles, buildings, crosswalks, obstacles, etc., from the ground truth. Metadata representing the motion information, past trajectory, physical characteristics, etc., of the objects may also be tagged on the objects.

At operation 913, the method 900 determines if there are data from the target LIDAR that cannot be labeled as a known object. In some embodiments, data that cannot be labeled as a known object may be distinguished from data that correspond to known objects. For example, an image processed from the captured data of the target LIDAR may identify unknown objects using a polygon box and known objects using a rectangle. In some embodiments, operation 913 may determine if data of the target LIDAR labeled with a known object is to be verified.

At operation 915, if there are data from the target LIDAR that cannot be labeled as a known object, the method 900 labels the data with a known object. In some embodiments, if data of the target LIDAR labeled with a known object is to be verified, the method 900 verifies the labeled object. In some embodiments, operation 915 may be manually performed in an offline process.

At operation 917, if the data from the target LIDAR have all been labeled with known objects, the method 900 uses the labeled data from the target LIDAR for training a deep learning neural network. In some embodiments, an offline machine learning engine may train a set of rules, algorithms, and/or predictive models of the deep learning neural network using the labeled data from the target LIDAR to recognize the objects corresponding to the labeled data. The trained set of rules, algorithms, and/or predictive models may be used by perception and planning system 110 to detect objects in the environment of an autonomous vehicle equipped with the target LIDAR during online operation.

A data processing system may perform any of the processes or methods described above, such as, for example, the method for labeling data from low-end target LIDARs using labeled objects generated from data captured by high-end reference LIDARs and other sensors. The data processing system can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

The data processing system may include one or more processors, one or more memories, and devices connected via a bus. Processors may represent one or more general-purpose processors such as a microprocessor, a central processing unit (CPU), or the like. More particularly, processors may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processors may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions. Processors may be configured to execute instructions stored in the memories for performing the operations and steps discussed herein.

Processing module/unit/logic, components and other features described herein can be implemented as discrete hardware components or integrated in the functionality of hardware components such as ASICS, FPGAs, DSPs or similar devices. In addition, processing module/unit/logic can be implemented as firmware or functional circuitry within hardware devices. Further, processing module/unit/logic can be implemented in any combination hardware devices and software components.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilising terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for labeling sensor data captured by an autonomous driving vehicles (ADV), the method comprising:
   receiving data captured by a reference light detection and range (LIDAR) sensor of the ADV;
   detecting a plurality of objects in a driving environment of the ADV from the data received by the reference LIDAR sensor to generate information for the plurality of objects;
   collecting target LIDAR data captured by a target LIDAR sensor of the ADV; and
   labeling the target LIDAR data using the information for the plurality of objects as ground truth to generate a plurality of labeled objects for the target LIDAR data.

2. The method of claim 1, wherein the target LIDAR sensor has a fewer number of rays than the reference LIDAR sensor.

3. The method of claim 1, wherein the target LIDAR data comprise data captured by the target LIDAR sensor from a same scene of the driving environment captured by the reference LIDAR sensor.

4. The method of claim 1, wherein the information for the plurality of objects comprise an object type for one or more of the plurality of objects and metadata of one or more of the plurality of objects.

5. The method of claim 4, wherein the plurality of labeled objects for the target LIDAR data comprise moving objects, non-moving obstacles, and motion information of the moving objects labeled using the metadata.

6. The method of claim 1, further comprising:
   receiving sensor data captured by one or more additional sensors of the ADV; and
   fusing the data captured by the reference LIDAR sensor and the sensor data captured by the one or more additional sensors to generate fused sensor data.

7. The method of claim 6, wherein detecting a plurality of objects in a driving environment of the ADV comprises generating the information for the plurality of objects for a plurality of time points by processing the fused sensor data.

8. The method of claim 6, the target LIDAR data comprise data that have not been labeled, and wherein the method further comprises:
   labeling offline the data that have not been labeled with one or more known objects.

9. The method of claim 1, further comprising:
   training a set of rules of a neural network using the plurality of labeled objects for the target LIDAR data to detect the plurality of objects.

10. A non-transitory machine-readable medium having instructions stored therein, which when executed by a processor, cause the processor to perform operations to label sensor data captured by an autonomous driving vehicles (ADV), the operations comprising:
    receiving data captured by a reference light detection and range (LIDAR) sensor of the ADV;
    detecting a plurality of objects in a driving environment of the ADV from the data received by the reference LIDAR sensor to generate information for the plurality of objects;
    collecting target LIDAR data captured by a target LIDAR sensor of the ADV; and
    labeling the target LIDAR data using the information for the plurality of objects as ground truth to generate a plurality of labeled objects for the target LIDAR data.

11. The non-transitory machine-readable medium of claim 10, wherein the target LIDAR sensor has a fewer number of rays than the reference LIDAR sensor.

12. The non-transitory machine-readable medium of claim 10, wherein the target LIDAR data comprise data captured by the target LIDAR sensor from a same scene of the driving environment captured by the reference LIDAR sensor.

13. The non-transitory machine-readable medium of claim 10, wherein the information for the plurality of objects comprise an object type for one or more of the plurality of objects and metadata of one or more of the plurality of objects.

14. The non-transitory machine-readable medium of claim 13, wherein the plurality of labeled objects for the target LIDAR data comprise moving objects, non-moving obstacles, and motion information of the moving objects labeled using the metadata.

15. The non-transitory machine-readable medium of claim 10, wherein the operations further comprise:
    receiving sensor data captured by one or more additional sensors of the ADV; and
    fusing the data captured by the reference LIDAR sensor and the sensor data captured by the one or more additional sensors to generate fused sensor data,
    and wherein the operations for detecting a plurality of objects in a driving environment of the ADV comprises generating the information for the plurality of objects for a plurality of time points by processing the fused sensor data.

16. The non-transitory machine-readable medium of claim 10, wherein the operations further comprise:
    training a set of rules of a neural network using the plurality of labeled objects for the target LIDAR data to detect the plurality of objects.

17. A data processing system, comprising:
    a processor; and
    a memory coupled to the processor to store instructions, which when executed by the processor, cause the processor to perform operations to label sensor data captured by an autonomous driving vehicles (ADV), the operations comprising:

receiving data captured by a reference light detection and range (LIDAR) sensor of the ADV;

detecting a plurality of objects in a driving environment of the ADV from the data received by the reference LIDAR sensor to generate information for the plurality of objects;

collecting target LIDAR data captured by a target LIDAR sensor of the ADV; and labeling the target LIDAR data using the information for the plurality of objects as ground truth to generate a plurality of labeled objects for the target LIDAR data.

18. The data processing system of claim 17, wherein the target LIDAR sensor has a fewer number of rays than the reference LIDAR sensor.

19. The data processing system of claim 17, wherein the operations further comprise:

receiving sensor data captured by one or more additional sensors of the ADV; and fusing the data captured by the reference LIDAR sensor and the sensor data captured by the one or more additional sensors to generate fused sensor data, and wherein the operation for detecting a plurality of objects in a driving environment of the ADV comprises generating the information for the plurality of objects for a plurality of time points by processing the fused sensor data.

20. The data processing system of claim 17, wherein the operations further comprise:

training a set of rules of a neural network using the plurality of labeled objects for the target LIDAR data to detect the plurality of objects.

* * * * *